(12) United States Patent  
Otani et al.

(10) Patent No.: US 8,963,472 B2
(45) Date of Patent: Feb. 24, 2015

(54) INTEGRATION OF SPINDLE EXTERNAL SENSE RESISTOR INTO SERVO IC WITH STABLE RESISTANCE CONTROL CIRCUIT

(71) Applicant: Texas Instruments Incorporated, Dallas, TX (US)

(72) Inventors: Daijiro Otani, Naoyuki (JP); Nakoyuki Tsuruoka, Tokyo (JP); Masaki Yamashita, Saitama (JP)

(73) Assignee: Texas Instruments Incorporated, Dallas, TX (US)

( * ) Notice: Subject to any disclaimer, the term of this patent is extended or adjusted under 35 U.S.C. 154(b) by 50 days.

(21) Appl. No.: 13/847,546

(22) Filed: Mar. 20, 2013

(65) Prior Publication Data
US 2013/0278199 A1  Oct. 24, 2013

Related U.S. Application Data

(60) Provisional application No. 61/613,336, filed on Mar. 20, 2012.

(51) Int. Cl.
*H02P 6/06* (2006.01)

(52) U.S. Cl.
USPC . 318/599; 318/254; 318/400.32; 318/400.34; 318/560; 330/285; 330/277

(58) Field of Classification Search
USPC ............... 318/599, 254, 560, 400.32, 400.34; 330/185, 285, 277
See application file for complete search history.

(56) References Cited

U.S. PATENT DOCUMENTS

| | | | | |
|---|---|---|---|---|
| 4,928,043 | A * | 5/1990 | Plunkett | 318/400.34 |
| 5,805,401 | A * | 9/1998 | Schuellein et al. | 361/92 |
| 5,867,001 | A * | 2/1999 | Lagerquist et al. | 318/400.32 |
| 6,462,496 | B1 * | 10/2002 | Hassan et al. | 318/560 |
| 2005/0093531 | A1 * | 5/2005 | Vorenkamp et al. | 323/316 |
| 2008/0068086 | A1 * | 3/2008 | Tsurumaki et al. | 330/277 |
| 2009/0072906 | A1 * | 3/2009 | Tsurumaki et al. | 330/277 |

* cited by examiner

*Primary Examiner* — Paul Ip
(74) *Attorney, Agent, or Firm* — Alan A. R. Cooper; Frederick J. Telecky, Jr.

(57) ABSTRACT

An apparatus, comprises three driver FETs coupled at their sources; note-driver circuit; a first sense FET coupled to the sources of the three driver FETs; a current mirror having the first sense FET and a mirror FET; wherein the first sense FET is coupled to the mirror FET; a first transconductance amplifier coupled to the first sense FET; a second amplifier coupled to the current mirror, and an output of the first transconductance amplifier is an input to the second amplifier.

18 Claims, 12 Drawing Sheets

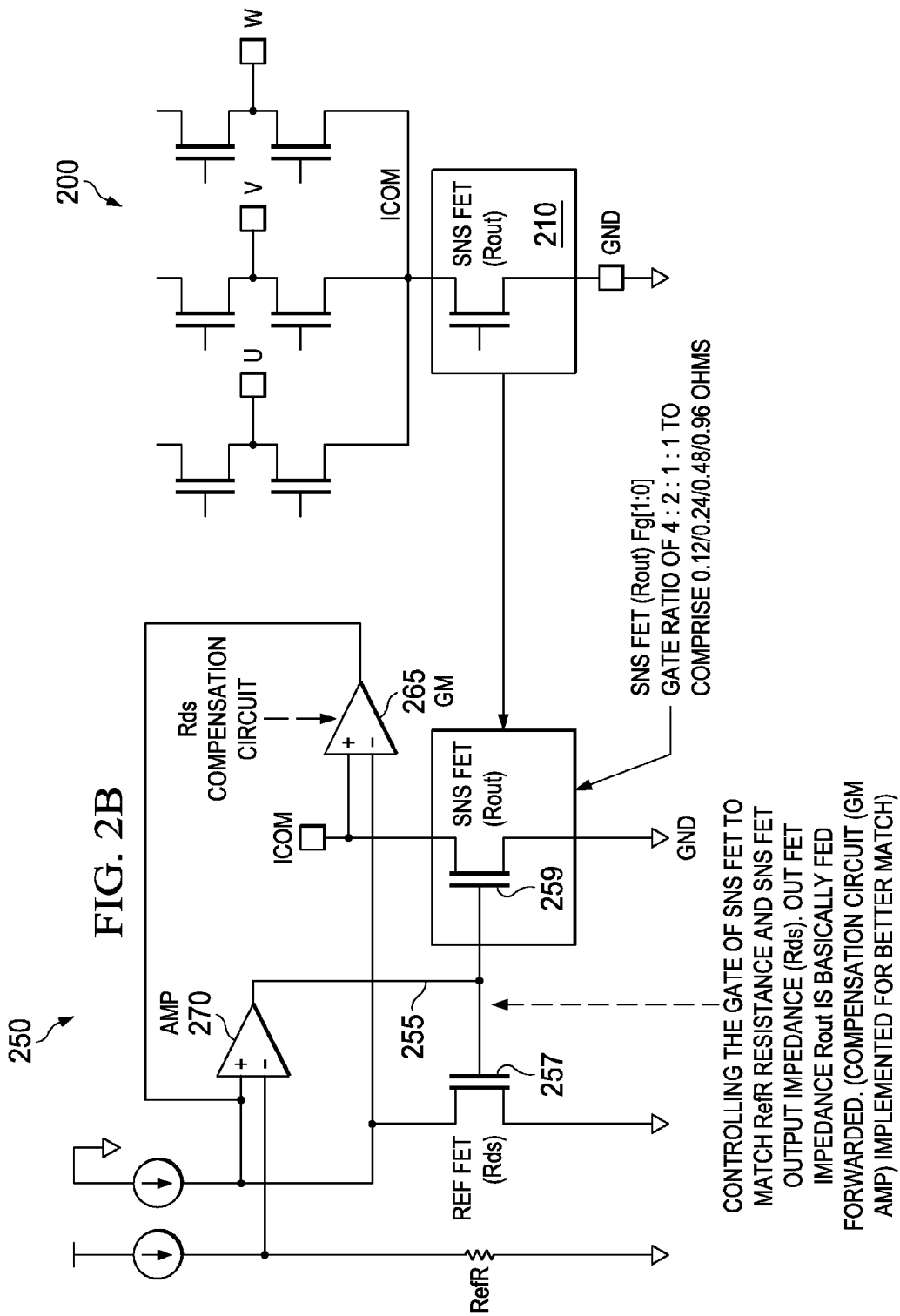

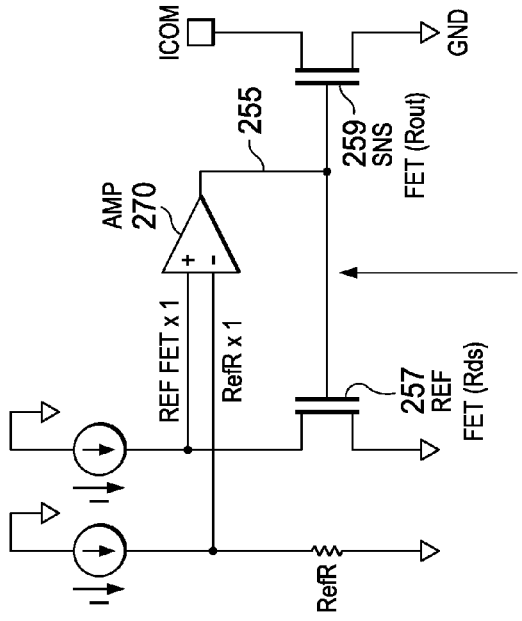
FIG. 2Bi
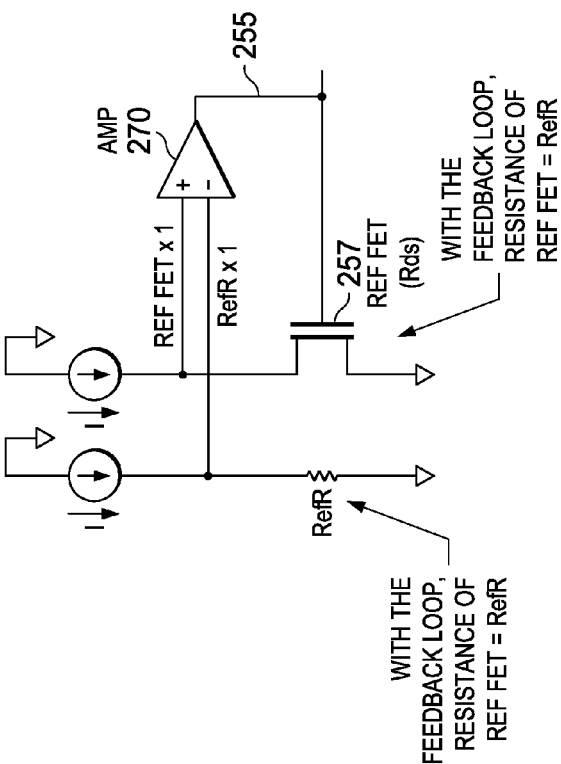
FIG. 2Bii

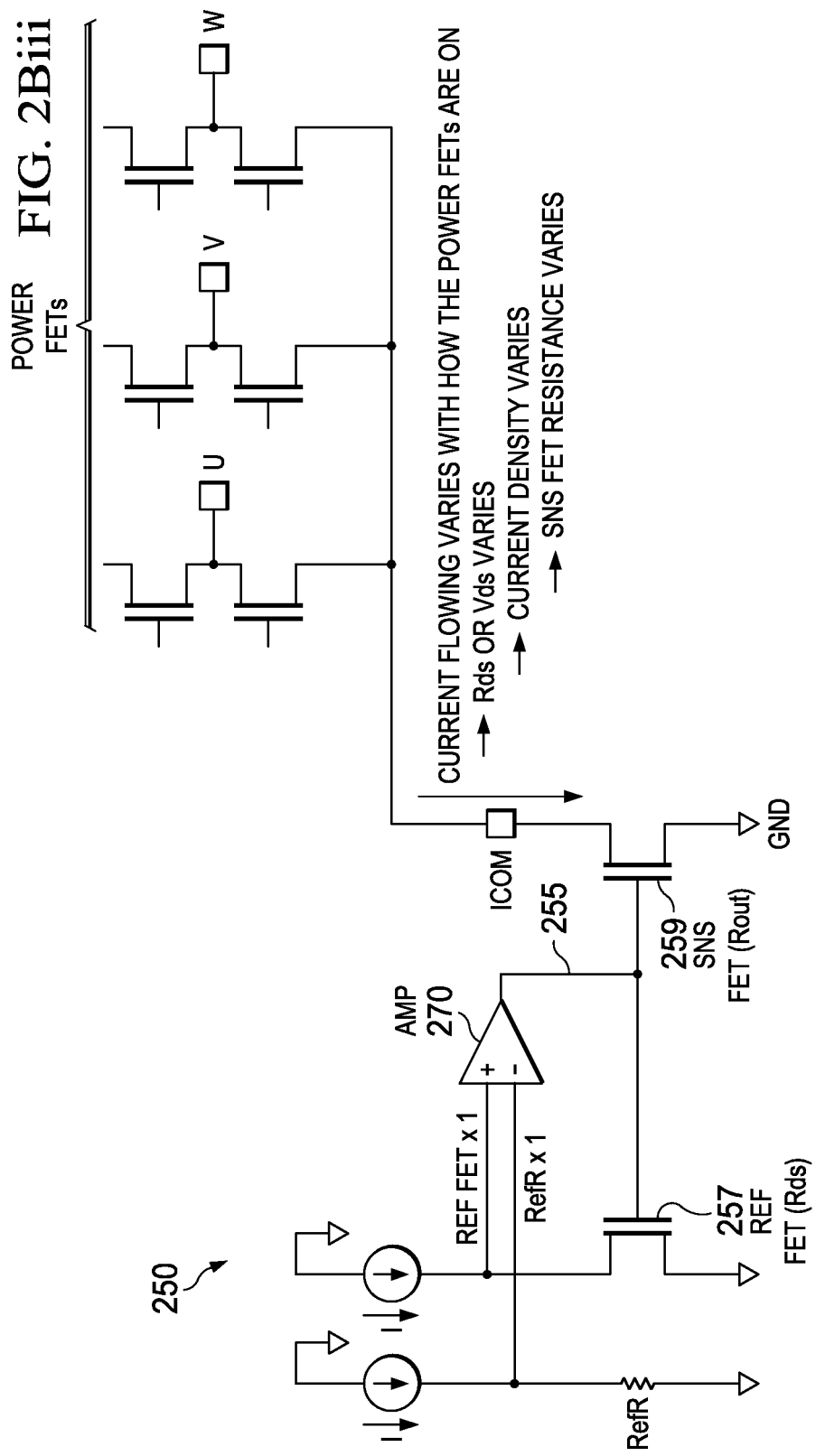
FIG. 2Biii

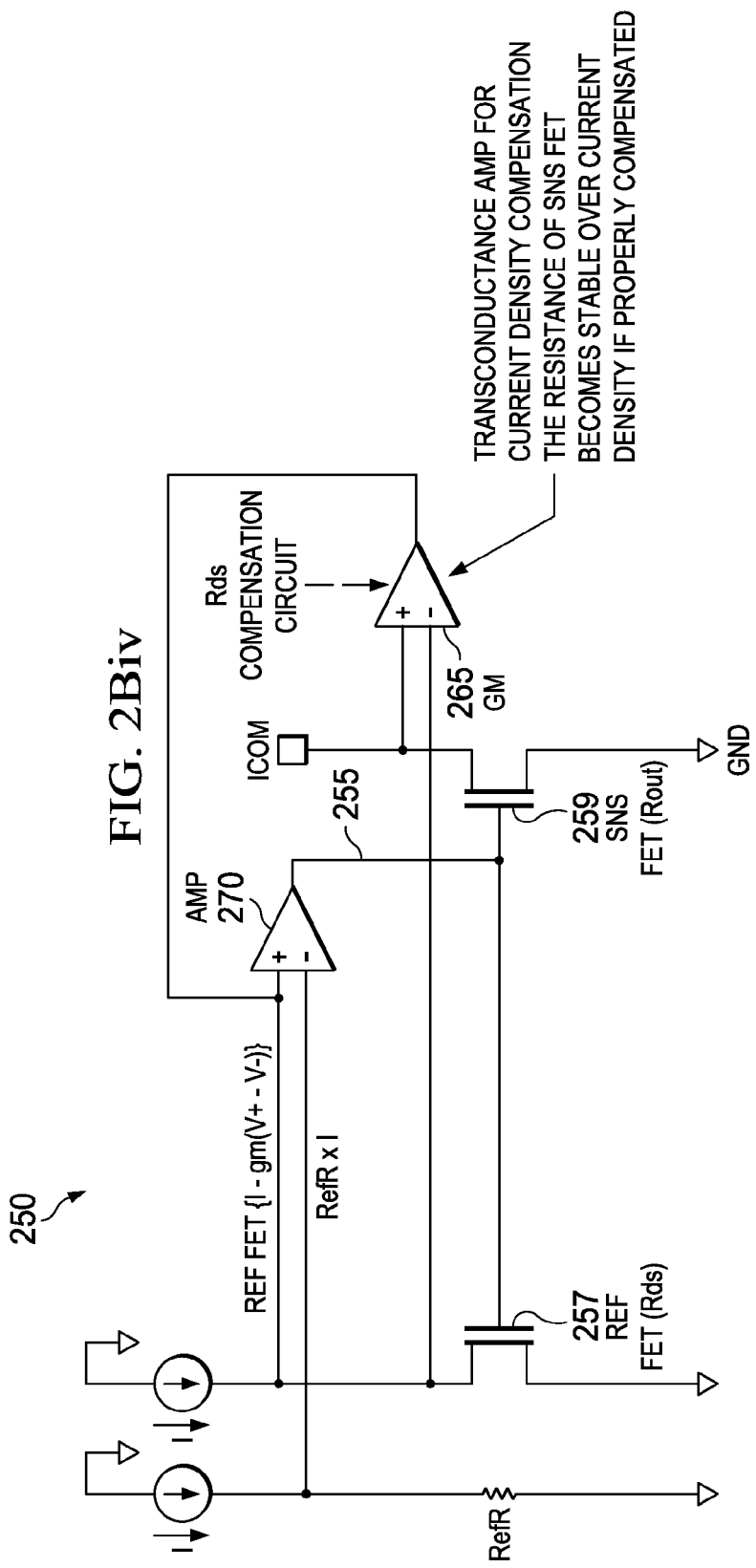
FIG. 2Biv

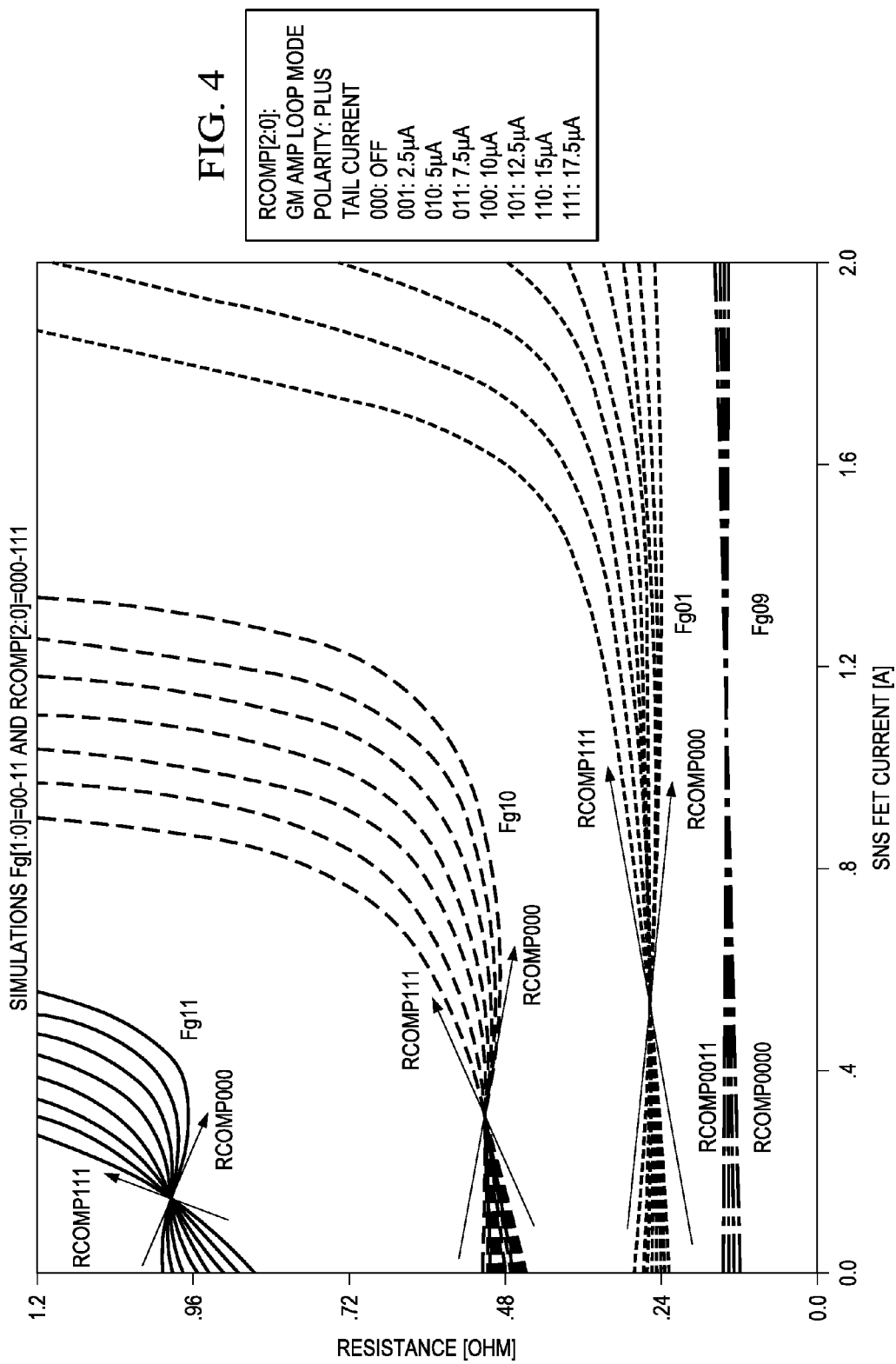

INTEGRATION OF SPINDLE EXTERNAL SENSE RESISTOR INTO SERVO IC WITH STABLE RESISTANCE CONTROL CIRCUIT

PRIORITY

This application claims priority to U.S. Provisional Application No. 61/613,336, filed Mar. 20, 2012, entitled "Integration of Spindle External Sense Resistor into Servo IC with Stable Resistance Control Circuit", which is incorporated by reference in its entirety.

TECHNICAL FIELD

This Application is directed, in general, to spindle motor control and, more specifically, to spindle motor control with a resistance control circuit for spindle motor control

BACKGROUND

FIG. 1A illustrates a prior art spindle motor control with an external sense resistor 110, which in the illustrated embodiment is a FET.

As is illustrated, there is a motor driver integrated circuit (IC) 105 coupled to a spindle motor 115. There is also a motor driver 120 with three individual phases 121-123 each drive the nodes "u," "v," and "w," thereby driving the spindle motor 115.

The amount of current being delivered by the motor driver 120 is sensed by the resistance 110. Generally, a control circuit 125 measures a voltage difference over resistor 110, and therefore knows how much current is being used to drive the spindle motor 115, thereby being able to regulate spindle motor 115.

However, there are drawbacks with this prior art approach. The resistor 110, which can typically be between 0.1 to 0.3 ohms, has to be able to handle a significant amount of current, even an ampere or more, and so is therefore large resistance capable of handling 0.1 to 2 watts or more, which can occupy significant real estate. Moreover, resistances can have significant variability of resistance from manufacturing batch to manufacturing batch; in order to help partially alleviate this drawback, the resistor may present a significant or even prohibitive expense.

Moreover, this approach uses three pins for sensing the three pins are: ICOM, RSNSP, and RSNSN from the motor drive IC. The increase of number of pins means increase in complexity, and possibly, cost.

To clarify, here are some descriptions to the node names:
ICOM is where 3 motor driver FETs are gathered
RSNSP is same node as ICOM, but right above the external resistor or integrated SNS FET (right above drain). The reason node names are different in one node is that, parasitic resistance has to be counted or taken cared. There may some parasitic resistance between ICOM and right above the resistor, which generates some voltage drop. So, in order to monitor ONLY the voltage across the external resistance (or integrated SNS FET), a wire (RSNSP) has to be tapped out and monitor the voltage from right above the resistor (or integrated SNS FET).
RSNSN is same node as GND, but right below the external resistor or integrated SNS FET (right below source). The reason node names are different in one node is that, parasitic resistance has to be counted or taken cared. There may some parasitic resistance between GND and right below the resistor, which generates some voltage drop. So, in order to monitor ONLY the voltage across the external resistance (or integrated SNS FET), a wire (RSNSN) needs to be tapped out and monitor the voltage from right below the resistor (or integrated SNS FET).

FIG. 1B illustrates a prior art spindle motor driver 133. A motor driver IC 138 includes a power FET driver circuit 150, current sensors 171-173 and FET current sensor transistors 176-178.

Prior Art FIG. 1B is a further evolution of FIG. 1A, which only has only 1 pin output (CS_PIN). This is possibly since the current flowing through the external resistor 180 is smaller than that of 110 in FIG. 1A, so the parasitic resistance is ignorable. This is realized by mirroring and scaling down the current flowing through U, V, and WFETs by using FETs 176, 177, and 178. This enables the value of the external resistor 180 to be ~kilo ohm order, which is smaller, parasitic resistance insensitive, and cost competitive.

However, there are disadvantages with this circuit as well. Although the resistance 180 is now in the kilohms, and therefore less problematic in some respects due to a lower overall power dissipation than the resistance 110 of the system 100, there are still other drawbacks with this circuit.

In the circuit 150, But this system needs at least 3-sense FET, i.e., Usns 176, Vsns 177, Wsns 178 for each 3-phase FET. However, Usns 176, Vsns 177, Wsns 178 each have their own variation. Therefore, a trimming circuit need for each senses FET 176-178, which therefore complicates the circuit large Moreover, even with trimming, the variation of sense FET 176-178 and the corresponding relative variation (Usns and V-sns or W-sns and Vsns etc.) are still problematic. Generally, due to the inadequate accuracy which comes from process variation, sometimes the control such like an inductive sense or a current limit etc. gets very difficult.

FIG. 1C illustrates a prior art alternative circuit 175 to a use of a sensor resistor. Instead a sensor a current summing FET 182, and a sense FET 184 are employed as a current mirror. However, there are disadvantages with this approach as well. For example, as the sense FET 184 is usually much smaller than the current FET 182, the two FETs can have different gain curves, etc.

As further examples, FIG. 1C The FIG. 1C system 175 requires the current input as the control circuit, while the conventional control system is voltage input. This means, the control system is also required to be re-designed for the current input system. If a resistor is integrated to convert the current to voltage in the IC, there is an extra need of trim for the resistor, in addition to the current trim for FET 182 and 184.

Therefore, there is a need in the art as understood by the present inventors to have a form of spindle control that addresses at least some of the disadvantages of the prior art

SUMMARY

A first aspect provides an apparatus, comprising: three driver FETs coupled at their sources; note-driver circuit first sense FET coupled to the sources of the three driver FETs; a current mirror having the first sense FET and a mirror FET; wherein the first sense FET is coupled to the mirror FET; a first transconductance amplifier coupled to the first sense FET; a second amplifier coupled to the current mirror, and an output of the first transconductance amplifier is an input to the second amplifier.

The first aspect can further variously provide wherein the gain of the first transconductance amplifier is changeable. a feedback loop between the sense transistor and a reference resistor coupled to a second input of the second amplifier, wherein the three driver FETs are driven by a PWM wave shape, a wave shaper coupled to the current mirror wherein the wave shaper is coupled to an output of a selectable sense resistor wherein a selectable sense resistor is selectable by at least two bits.

A second aspect provides an apparatus, comprising: a waveshaper that generates a pulse width modulated signal; a programmable gain (Cg), coupled to the waveshaper, three driver FETs coupled at their sources that are drive by the pulse width modulated signal; a first sense FET coupled to the sources of the three driver FETs; a current mirror having the first sense FET and a mirror FET; wherein the first sense FET is coupled to the mirror FET; a first transconductance amplifier coupled to the first sense FET; a second amplifier coupled to the current mirror, and an output of the first transconductance amplifier is an input to the second amplifier wherein the overall system gain consistent when the gain of the programmable gain (Cg) and a gain of the selectable sense transistor are changed at substantially the same time.

The second aspect can further variously provide wherein if the gain of the Cg is changed from x1 to X2, the selectable sense transistor is changed from x2 to x1, wherein the overall system gain is consistent wherein if the gain of the Cg is changed from x2 to x1, the selectable sense transistor is changed from x1 to x2, wherein the overall system gain is consistent. wherein without a substantially synchronous change between the selectable sense transistor and the programmable gain, the system loses its stability until the overall gain becomes consistent, and wherein the sense transistor is employable as sense resistor, wherein the instability is correlated to a rotation speed change on the spindle motor until the speed control loop provides the feedback.

A third aspect provides an apparatus, comprising: a waveshaper that generates a pulse width modulated signal; a programmable gain (Cg), coupled to the waveshaper three driver FETs coupled at their sources that are drive by the pulse width modulated signal; a first sense FET coupled to the sources of the three driver FETs; a current mirror having the first sense FET and a mirror FET; wherein the first sense FET is coupled to the mirror FET; a first transconductance amplifier coupled to the first sense FET; a second amplifier coupled to the current mirror, an output of the first transconductance amplifier is an input to the second amplifier; a feedback loop between the sense transistor and a reference resistor coupled to a second input of the second amplifier; and wherein the overall system gain consistent when the gain of the programmable gain (Cg) and a gain of the selectable sense transistor are changed at substantially the same time The third aspect can further variously provide, wherein the three driver FETs are driven by a PWM wave shape wherein a wave shaper coupled to the current mirror, wherein the wave shaper is coupled to an output of a selectable sense resistor. wherein a selectable sense resistor is selectable by at least two bits.

BRIEF DESCRIPTION OF THE DRAWINGS

Reference is now made to the following descriptions:

FIGS. 2Bi-2Bv illustrate various stages of the sense compensation of FIG. 2B;

FIG. 4 illustrates various simulations of various simulations of the SNS FET resistance setting and the effect of Rds compensation circuit according to the principles of the present Application.

DETAILED DESCRIPTION

Figure 1A:
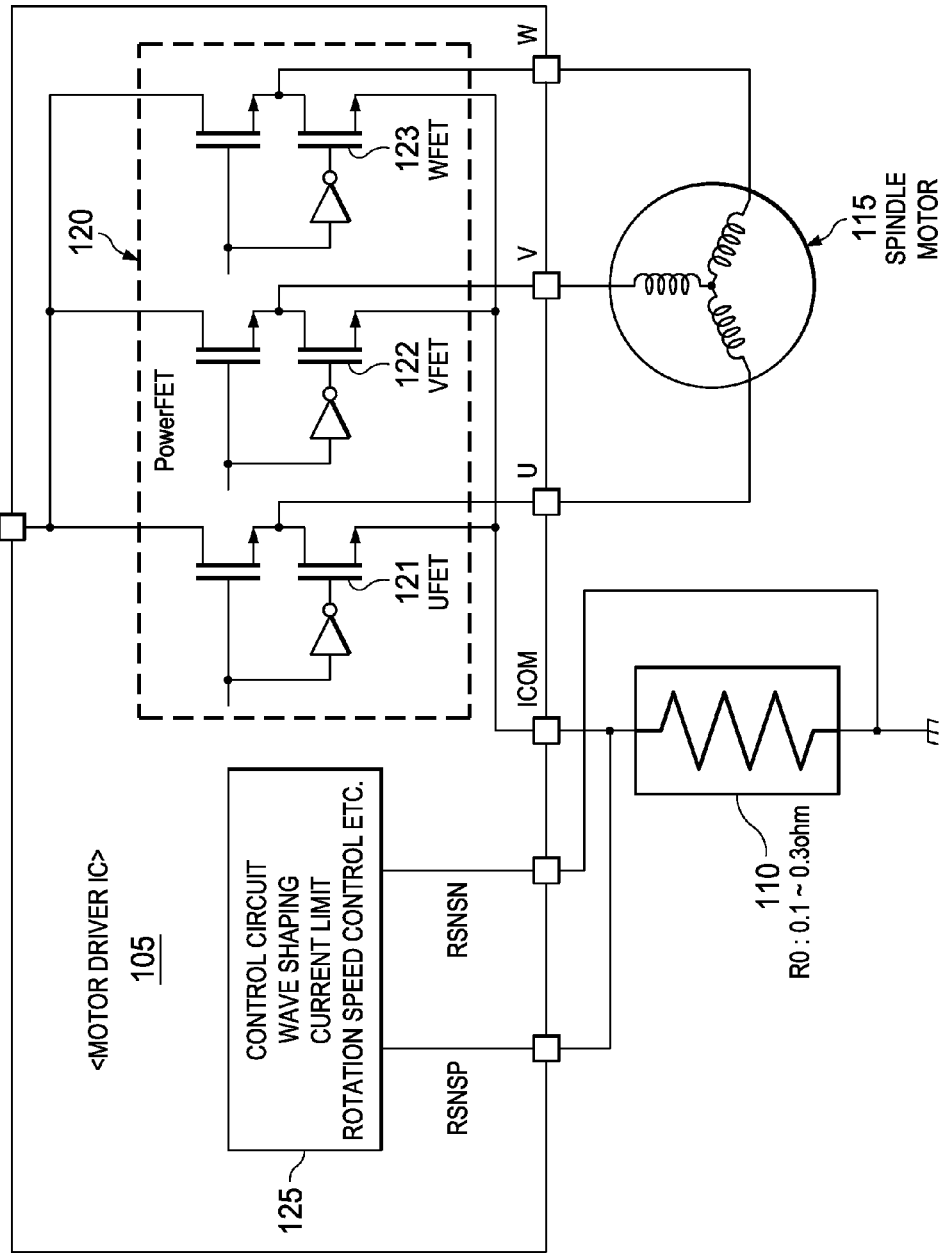
FIG. 1A illustrates a prior art motor driver and spindle driver with a large external resistance, wherein the external resistance allows for a high wattage capability, and the resistance value is as small as 0.1 ohm.
Figure 2A:
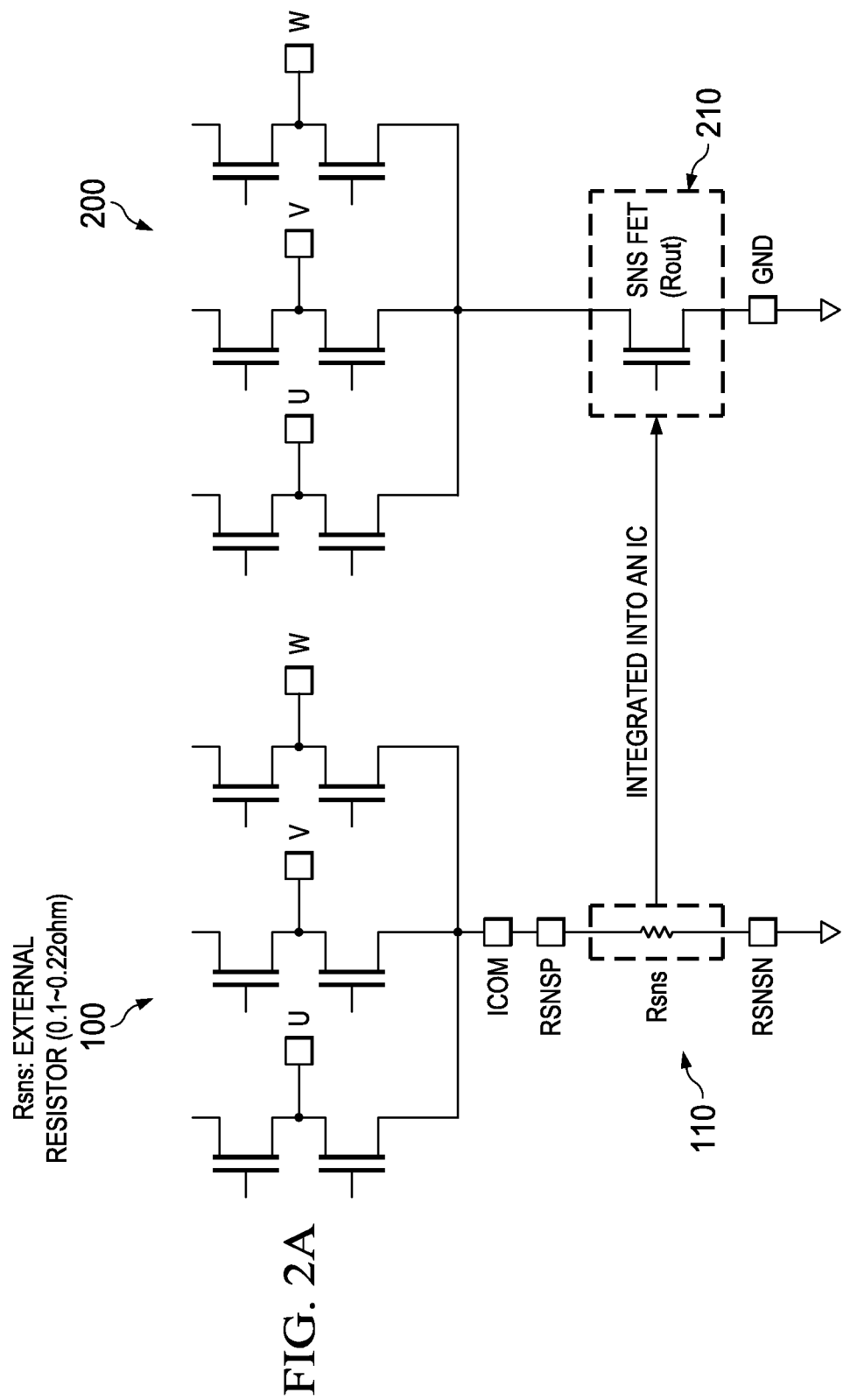
FIG. 2A illustrates an integration of an external resistor of FIG. 1A into an internal FET of the system 200.

Turning to FIG. 2A, illustrated is one aspect of a circuit 200. In FIG. 2A, the Rsns of resistor 110 of FIG. 1A has been instead integrated into an integrated circuit chip through a FET 210. Use of the FET 210 allows for a monolithic integration of the FET. Generally, FIG. 2A is an illustration view of integrating the external sense resistor Rsns of 100 into an IC 200 by using SNS FET 210.

Figure 2B:
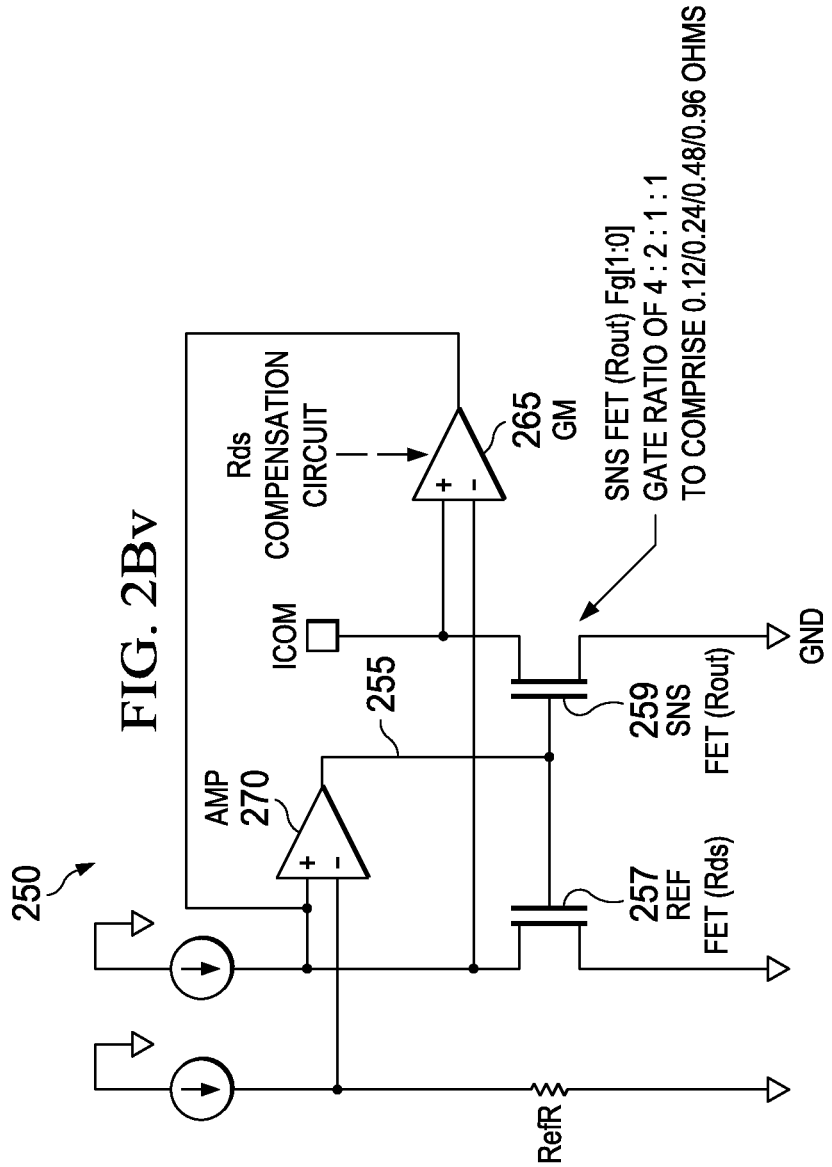
FIG. 2B illustrates a system including the sense compensation of FIG. 2A.

FIG. 2B illustrates a circuit 250 that then employs the advantages of an integration of the FET 210 into an integrated circuit to couple to a current mirror 255. The current mirror 255 includes a first FET 257 and a second FET 259.

Figure 1B:
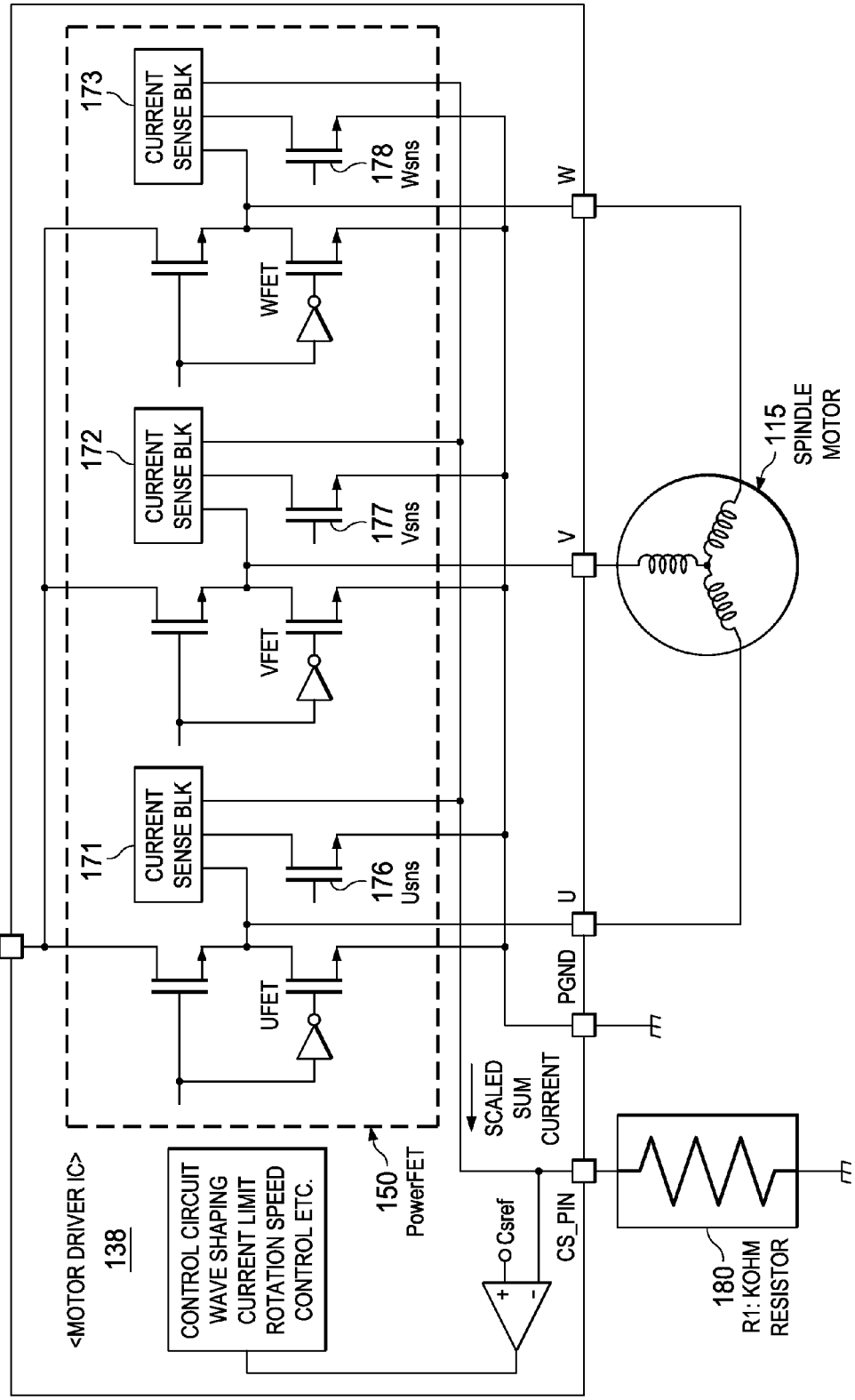
FIG. 1B illustrates a prior art motor driver and spindle driver with multiple current sensors.
Figure 1C:
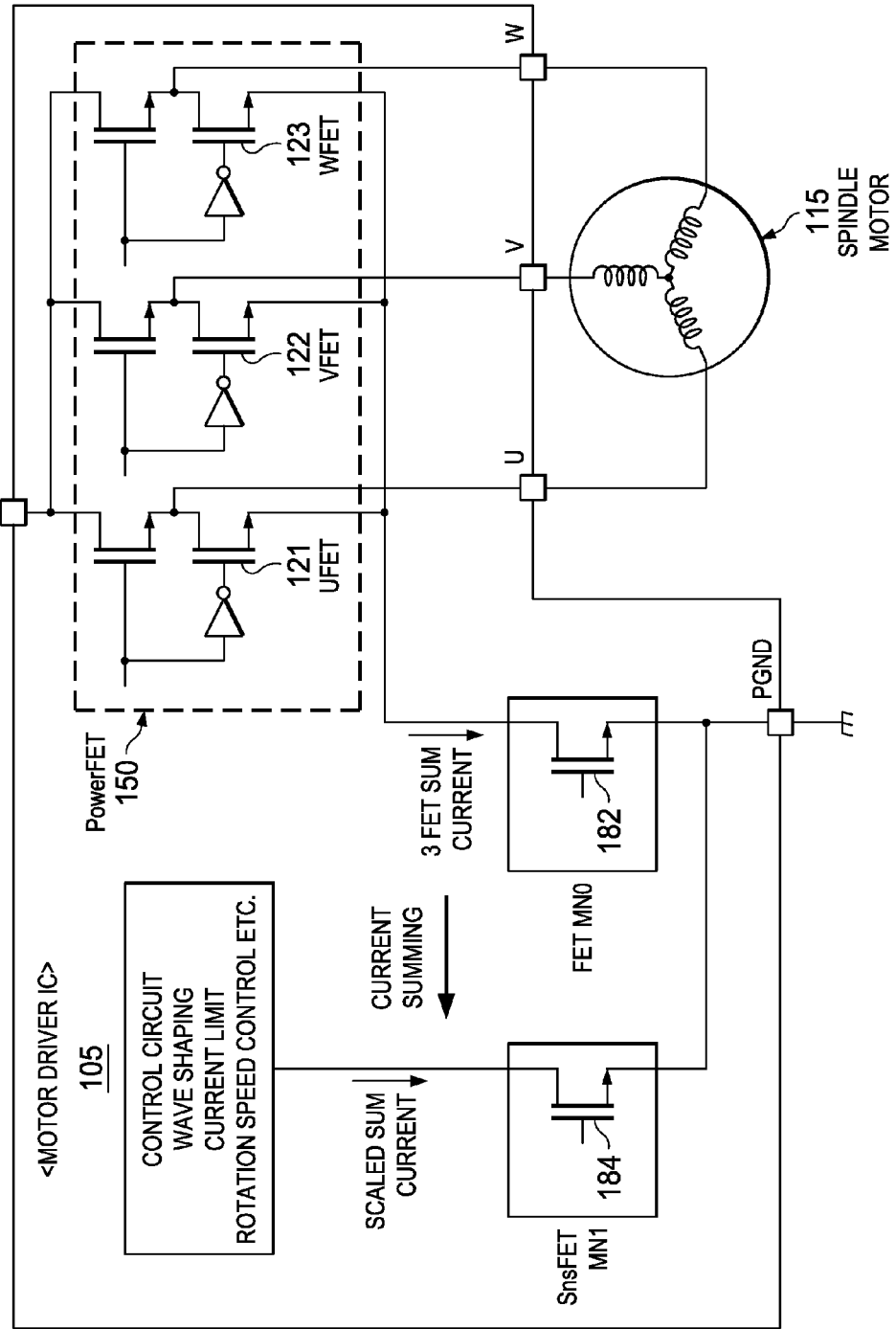
FIG. 1C illustrates a prior art motor driver and spindle driver that uses a current mirror sense FET.

FIG. 2B circuit 250 is the integration of the external resistor of FIG. 1A. FIGS. 1B and 1C are evolved circuit from 1A, but FIG. 2B is from 1A to simply integrate the external resistor into an IC. FIG. 2B 250 includes the actual connection of the control circuit which controls and stabilizes the resistance of the integrated SNS FET 259 over various current flowing through the SNS FET 259. SNS FET 210 and 259 in FIG. 2B are the same FETs. The circuit 250 shows the controlling circuit of the SNS FET 210 or 259, while the circuit 200 only shows the connectivity of the SNS FET and the spindle motor driver power FETs.

In the circuit 250, the SNS FET 259 has the same rdson as the FET 210, and the same current flow. Therefore, a voltage appears across the SNS FET 210, which also appears across the FET 259. The ICOM is applied to the non-inverting input of a ("first") transconductance amplifier 265. The output of the transconductance amplifier 265 is then fed into the non-inverting input of a "second" amplifier 270. The inverting input is coupled to a stable reference voltage.

In FIG. 2Bi, the basic circuit loop is configured by RefR, REF FET 257, and AMP 270. The voltage generated by RefR and the current source is connected to inverting input of the amp 270. The voltage generated by REF FET 257 resistance and the current source is connected to non-inverting input of the amp 270. The output of amp 270 is connected to the gate of REF FET 257, and the output voltage is feedback to non-inverting input of amp 270 through REF FET 257.

This makes REF FET resistance to be equal to RefR by the feedback loop.

In FIG. 2Bii, an output of amp 270 is also connected to the gate of SNS FET. REF FET and SNS FET are in ratio. Example: SNS FET is 10000 times larger than REF FET, the resistance Rds of SNS FET is basically ¹⁄₁₀₀₀₀ of Rds of REF FET, yields ¹⁄₁₀₀₀₀ resistance of RefR.

As is illustrated in FIG. 2Biii, however, the drain of the SNS FET is connected to Power FET U, V, and W, and the current which flows through the SNS FET varies over time. This creates difference in Rds, and hence, the resistance varies over its current density.

As illustrated in FIG. 2Biv, now, in order to compensate the resistance over the current density, the Rds compensation circuit, which is a transconductance amp, is implemented. The circuit monitors the voltage difference of drain voltages of REF FET and SNS FET, and feeds back current in accordance with the amount of voltage difference.

As is illustrated in FIG. 2Bv, in addition to the above configuration, SNS FET resistance is switch selectable. By changing the size of FETs of SNS FET 259 connected to the output of amp 270, the output resistance is changeable.

Generally, the present disclosure improves upon the circuits of FIG. 1A. FIGS. 1B and 1C are improvements over FIG. 1A. A benefits of improvement over FIG. 1A is that, it does not need to change or re-design any other circuits other than just adding SNS FET circuitry, whereas FIG. 1B and FIG. 1C need many modifications other than integrating the external resistor.

Figure 3A:
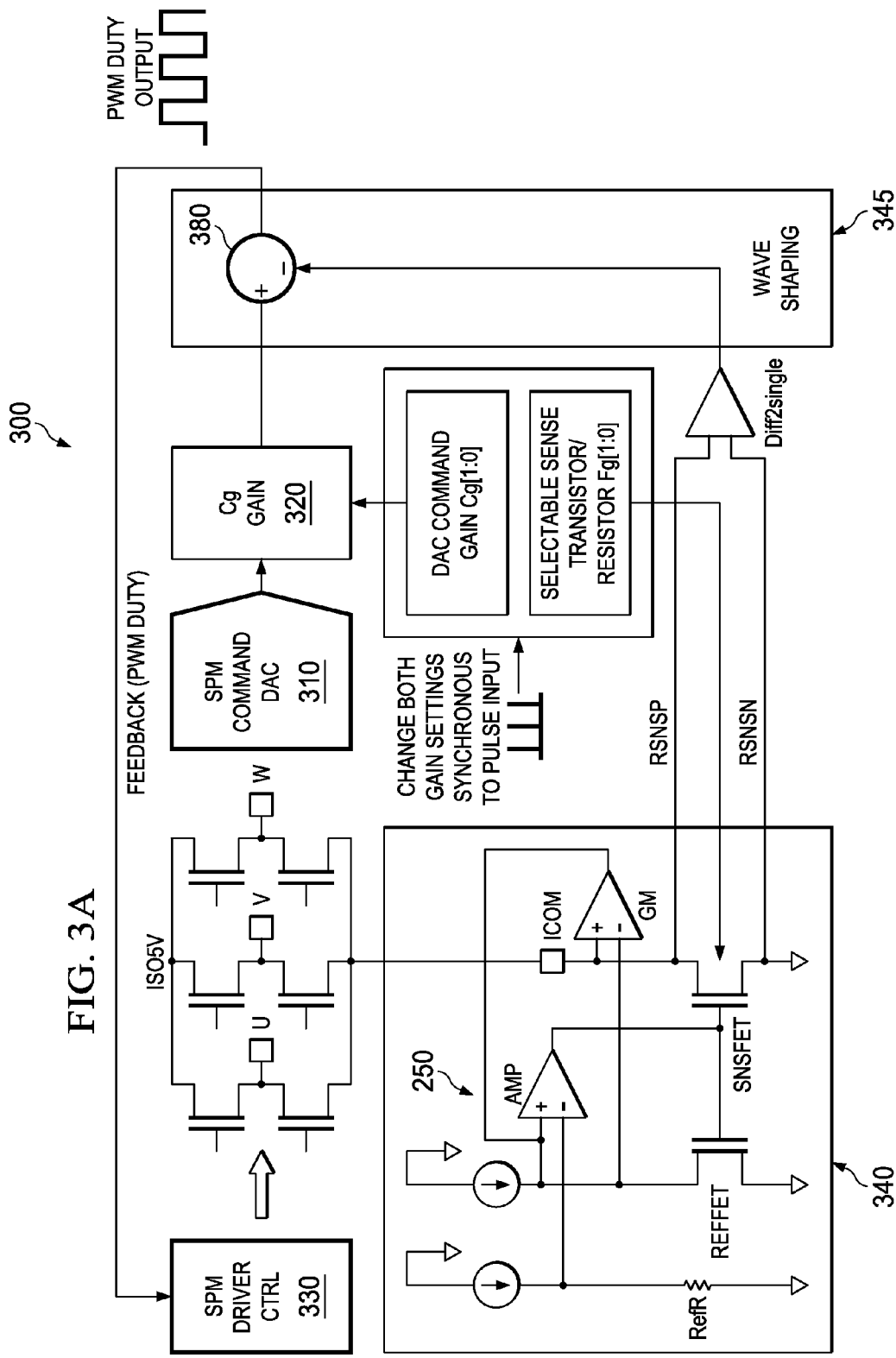
FIG. 3A illustrates using a synchronous pulse in the system of FIG. 2B; a spindle motor driver PWM controlling overview with synchronous pulse to change sense resistor gain and spindle motor DAC gain.

FIG. 3A illustrates an employment of an employable FET. The FIG. 2B is the circuit 340 in FIG. 3A.

The SPM Command DAC 310 is set into a certain output. The command DAC 310 output is gained by Cg[1:0] and feed into plus input of the summing amp 380. The PWM duty output changes according to the output of the Cg gain 320. The SPM Driver control 330 drives the output U, V, W FET's, which results in current flowing through the sense resistor SNSFET in 250. The selectable sense resistor SNSFET in 250 is set by sense resistor gain Fg[1:0], which determines the voltage difference between RSNSP and RSNSN. The RSNSP and RSNSN voltages are converted from differential to single voltage, then feed into the negative input of the summing amp 380 as a feedback. The command gain Cg and the selectable sense resistor Fg correlates each other to determine the total system gain.

Figure 3B:
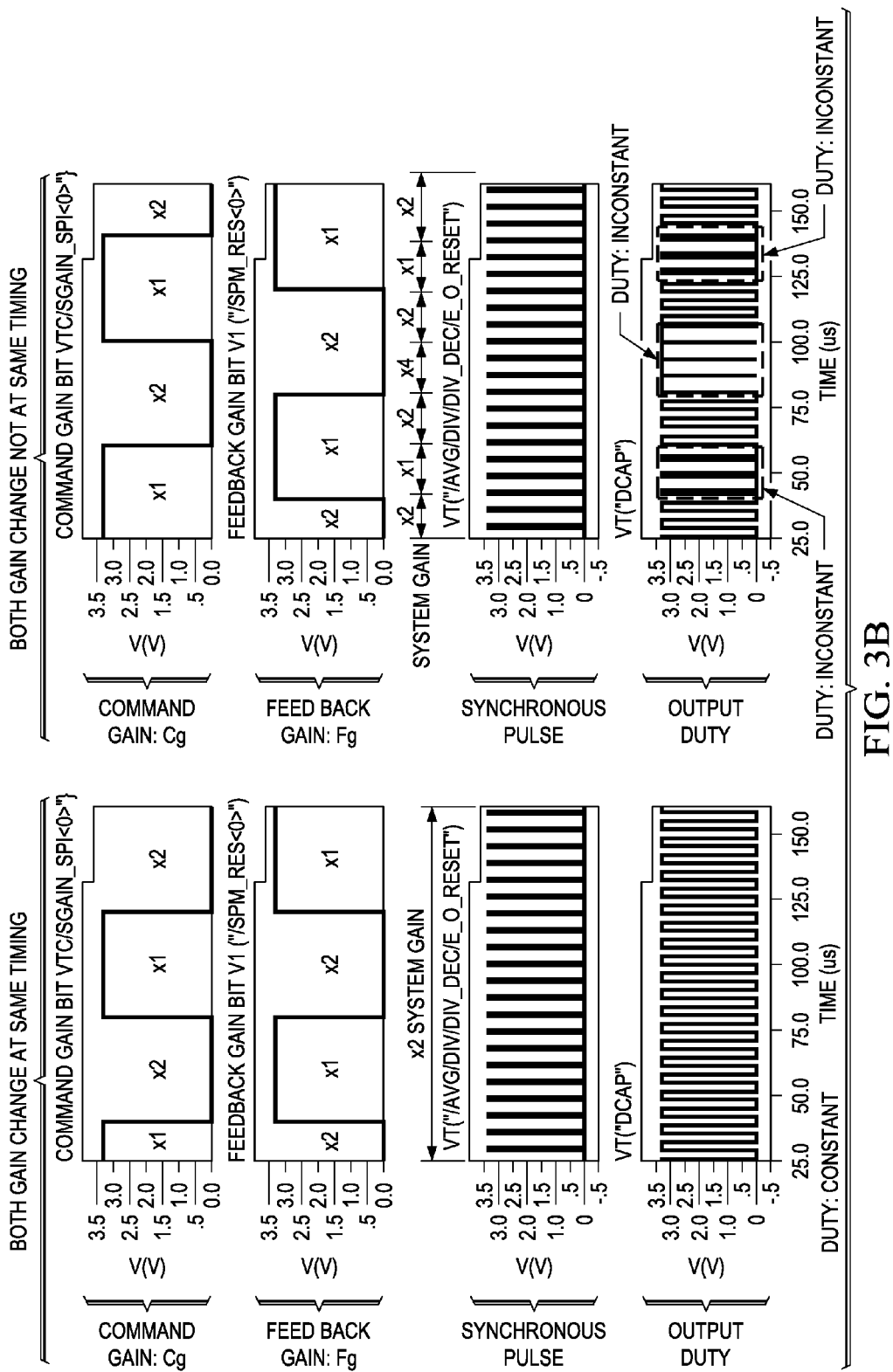
FIG. 3B illustrates simulation results in spindle motor drive (SPM) PWM duty case using a synchronous pulse.

FIG. 3B illustrates a comparison between the command gain Cg and the feedback gain Fg are changed at the same time (left waveforms), or different time (right waveforms). As seen on the left waveforms, if Cg and Fg gains are changed at the same time from x1 to x2, and x2 to x1, the output duty are stable, even though the gain change happens. On the other hand, as on the right waveforms, if Cg and Fg gains are changed independently, the output duty are not consistent. So, the technique of changing the gains simultaneously aligned with the synchronous pulse, is important for the constant spindle rotation.

FIG. 4 illustrates a simulation result of resistance of the circuit in FIG. 2B. The parameters are SNS FET resistance settings and tail current of the transconductance amp settings. The X axis is current flows through SNS FET. The Y axis is the resistance of the SNS FET. The SNSFET settings are 2 bit (4 kinds), which basically sets the resistance to 0.12, 0.24, 0.48, and 0.96 ohm. As the tail current of the transconductance amp, set by 3 bit RCOMP (8 settings), the 'flatness' of the SNS FET resistance over input current changes. The result shows there is best RCOMP setting which provides the maximum flatness over current density to compensate mismatch of current density between SNS FET and REF FET in FIG. 2B.

Those skilled in the art to which this application relates will appreciate that other and further additions, deletions, substitutions and modifications may be made to the described embodiments.

What is claimed is:

1. An apparatus, comprising:
    three driver FETs coupled at their sources;
    a first sense FET coupled to the sources of the three driver FETs;
    a current mirror having the first sense FET and a mirror FET;
    wherein the first sense FET is coupled to the mirror FET;
    a first transconductance amplifier coupled to the first sense FET; a second amplifier coupled to the current mirror; and
    an output of the first transconductance amplifier is an input to the second amplifier.

2. The apparatus of claim 1, further comprising wherein the gain of the first transconductance amplifier is changeable.

3. The apparatus of claim 1, further comprising a feedback loop between the sense transistor and a reference resistor coupled to a second input of the second amplifier.

4. The apparatus of claim 1, wherein the three driver FETs are driven by a PWM wave shape.

5. The apparatus of claim 1, further comprising a wave shaper coupled to the current mirror.

6. The apparatus of claim 5, further comprising wherein the wave shaper is coupled to an output of a selectable sense resistor.

7. The apparatus of claim 6, further comprising wherein a selectable sense resistor is selectable by at least two bits.

8. An apparatus, comprising:
    a waveshaper that generates a pulse width modulated signal;
    a programmable gain (Cg), coupled to the waveshaper
    three driver FETs coupled at their sources that are drive by the pulse width modulated signal;
    a first sense FET coupled to the sources of the three driver FETs;
    a current mirror having the first sense FET and a mirror FET;
    wherein the first sense FET is coupled to the mirror FET;
    a first transconductance amplifier coupled to the first sense FET;
    a second amplifier coupled to the current mirror, and
    an output of the first transconductance amplifier is an input to the second amplifier
    wherein the overall system gain consistent when the gain of the programmable gain (Cg) and a gain of the selectable sense transistor are changed at substantially the same time.

9. An apparatus of claim 8, wherein if the gain of the Cg is changed from x1 to X2, the selectable sense transistor is changed from x2 to x1, wherein the overall system gain is consistent.

10. An apparatus of claim 8, wherein if the gain of the Cg is changed from x2 to x1, the selectable sense transistor is changed from x1 to x2, wherein the overall system gain is consistent.

11. The apparatus of claim 8, wherein without a substantially synchronous change between the selectable sense transistor and the programmable gain, the system loses its stability until the overall gain becomes consistent.

12. The apparatus of claim 9, wherein the instability is correlated to a rotation speed change on the spindle motor until the speed control loop provides the feedback.

13. The apparatus of claim 9, wherein the sense transistor is employable as sense resistor.

14. An apparatus, comprising:
    a waveshaper that generates a pulse width modulated signal;
    a programmable gain (Cg), coupled to the waveshaper
    three driver FETs coupled at their sources that are drive by the pulse width modulated signal;
    a first sense FET coupled to the sources of the three driver FETs;
    a current mirror having the first sense FET and a mirror FET;

wherein the first sense FET is coupled to the mirror FET;
a first transconductance amplifier coupled to the first sense FET;
a second amplifier coupled to the current mirror,
an output of the first transconductance amplifier is an input to the second amplifier;
a feedback loop between the sense transistor and a reference resistor coupled to a second input of the second amplifier; and
wherein the overall system gain consistent when the gain of the programmable gain (Cg) and a gain of the selectable sense transistor are changed at substantially the same time.

15. The apparatus of claim 14, wherein the three driver FETs are driven by a PWM wave shape.

16. The apparatus of claim 14, further comprising a wave shaper coupled to the current mirror.

17. The apparatus of claim 14, further wherein the wave shaper is coupled to an output of a selectable sense resistor.

18. The apparatus of claim 14, further comprising wherein a selectable sense resistor is selectable by at least two bits.

* * * * *